Jan. 22, 1929.

V. WILLOUGHBY

1,699,649

MULTIUNIT TANK CAR

Filed Jan. 16, 1928      6 Sheets-Sheet 1

INVENTOR
Victor Willoughby
BY F. H. Gibbs
ATTORNEY

Patented Jan. 22, 1929.

1,699,649

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

MULTIUNIT-TANK CAR.

Application filed January 16, 1928. Serial No. 247,063.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

This invention relates to railway cars adapted particularly for the transportation of a plurality of containers such as gas or liquid holding tanks, the cars being known as multi-unit tank cars.

One object of this invention is the provision of a multi-unit tank car in which the tanks are vertically arranged.

Another object of this invention is the provision of a multi-unit tank car having means for retaining vertically positioned tanks against shifting.

A further object of the invention is the provision of a multi-unit tank car in which the tanks are arranged in the car in such a manner as to maintain the center of gravity of the car as low as possible.

Figure 3:
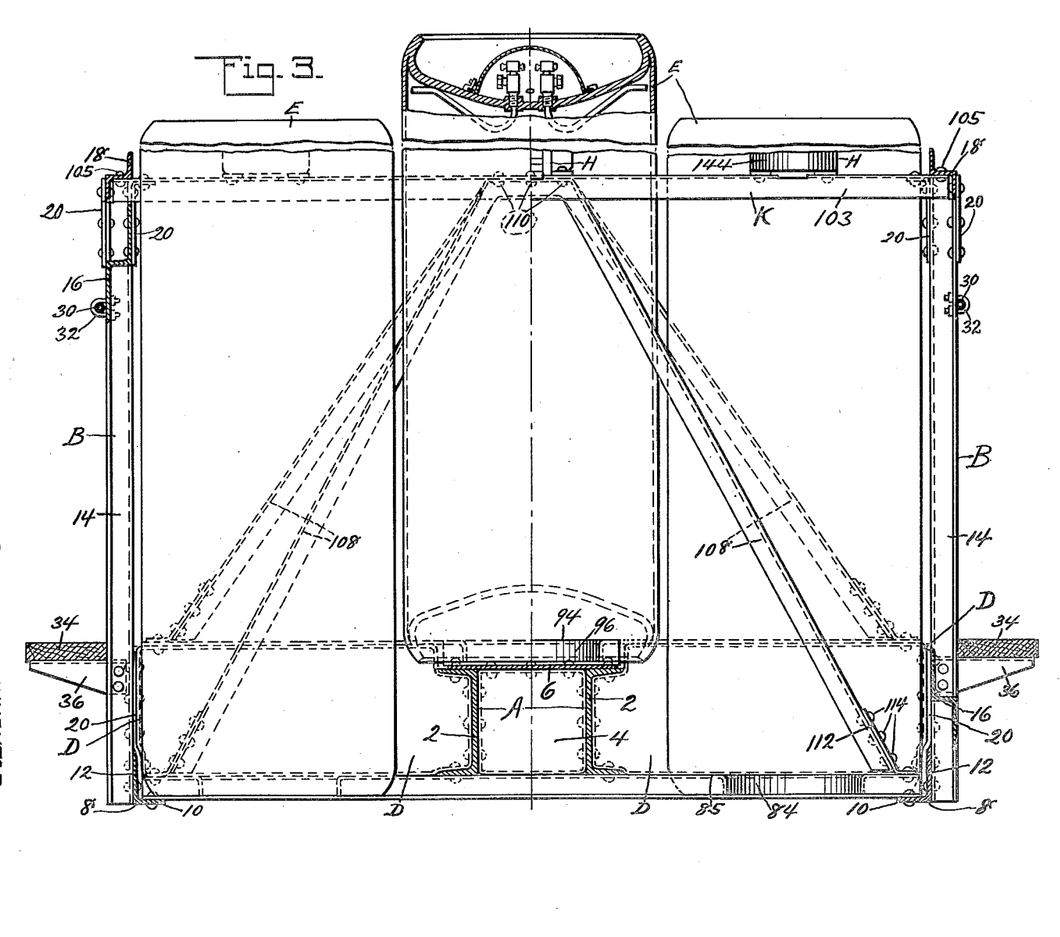
Fig. 3 is a view on the line 3—3 of Fig. 2.

With the above and other objects in view, this invention comprises a car having a suitable underframe mounted on trucks, the underframe including a center sill indicated generally at A and formed of spaced channels 2 connected by webs 4 and a cover plate 6, all as clearly shown in Fig. 3. The car also includes the side girders B, bolters C and cross-bearers D.

Figure 2:
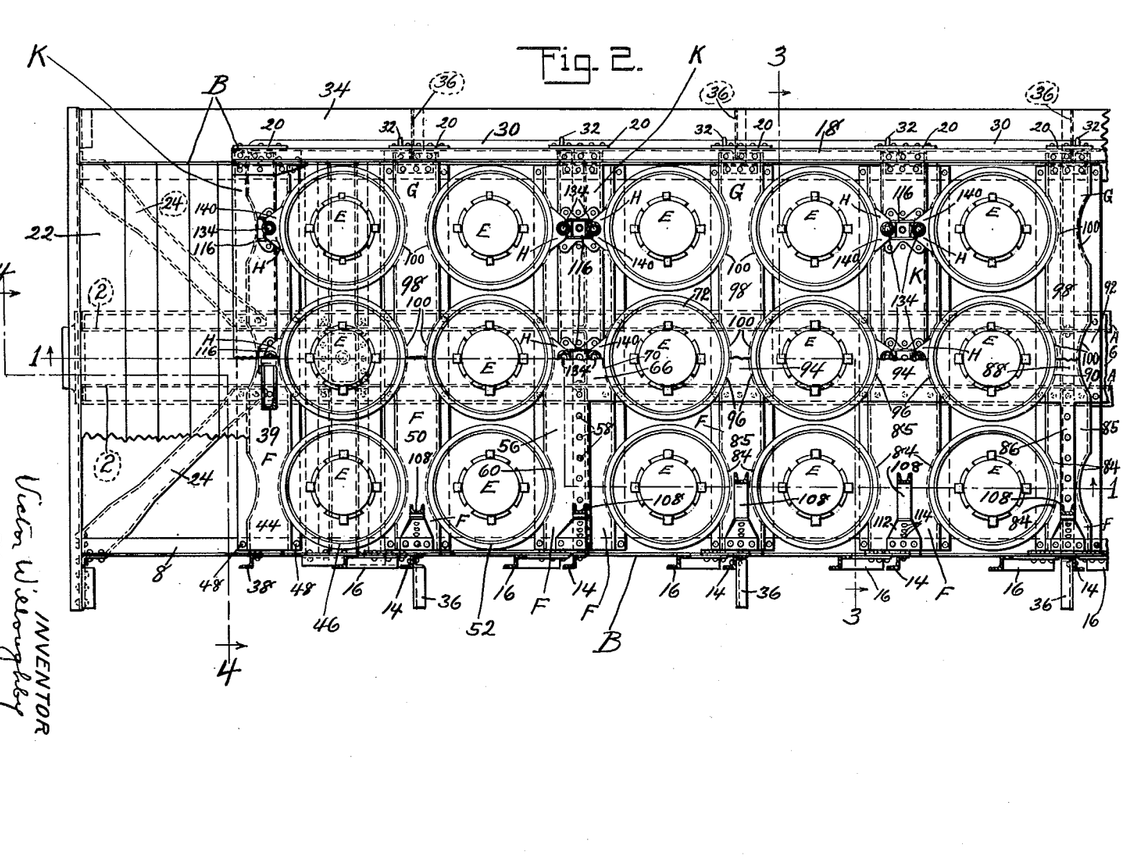
Fig. 2 is a top plan view of the car of the present invention, certain parts being shown in section, and other parts being broken away.
Figures 5, 6, 7:
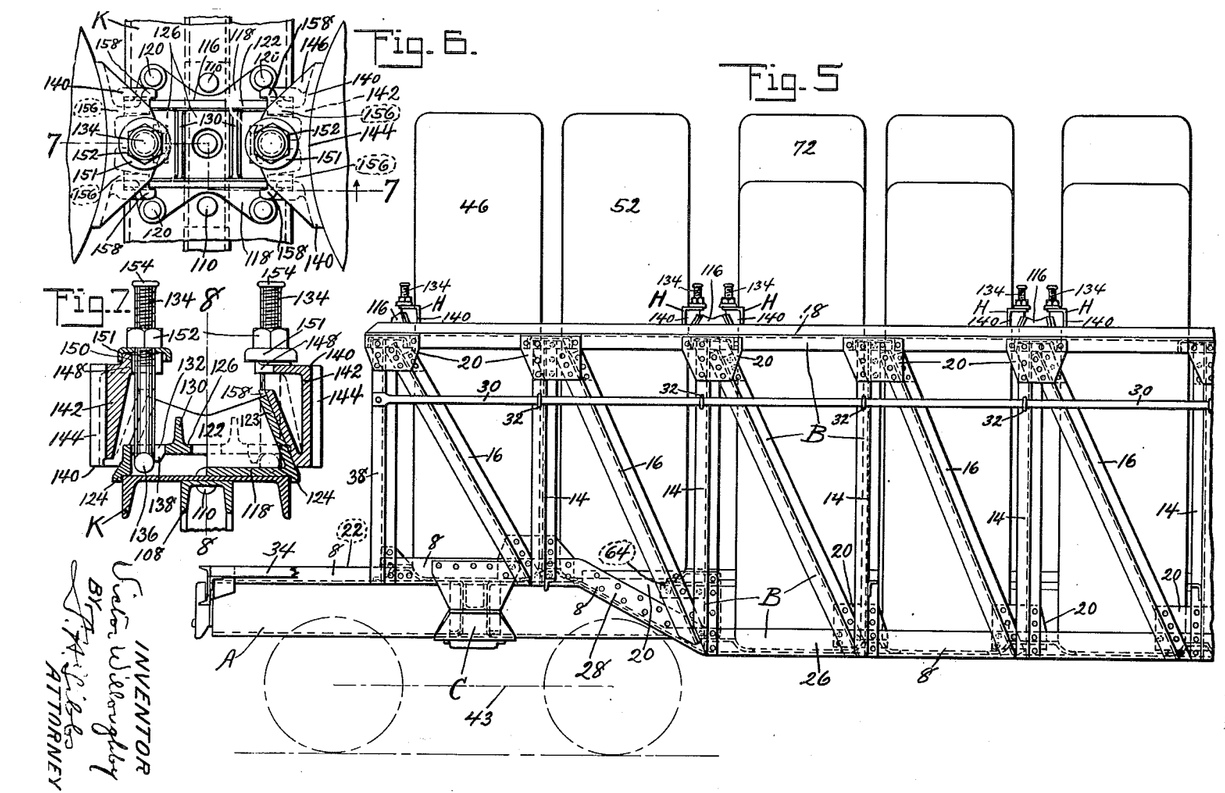
Fig. 5 is a side elevation of one end of the car.
Fig. 6 is a top plan view of one of the clamps for securing the tanks, a portion of the latter being shown.
Fig. 7 is a sectional view on the line 7—7 of Fig. 6.

Fig. 5 shows more clearly the construction of the side girders, and in said figure, it can be seen that they comprise a bottom chord 8 which is preferably an angle the horizontal leg 10 of which extends inwardly as shown in Fig. 3, and the vertical leg 12 has secured thereto the lower ends of the verticals 14 and diagonals 16. The upper ends of the verticals and diagonals are secured to the top chord 18 of the side girder, the top chord being preferably a Z-bar as shown in Fig. 3. Adjacent the points of connection of the verticals 14 and diagonals 16 with the top and bottom chords of the side girders, gussets 20 are provided for reinforcing purposes. The top chord is of less length than the bottom chord, providing a space at each end of the car for an end platform 22. The car ends are preferably reinforced by braces 24 extending from the corners of the car to the center sill A (see Fig. 2).

The bottom chord 8 is not straight from end to end of the car but is provided with a depressed portion 26 intermediate its ends and intermediate the trucks which is defined by the angular portions 28 of said bottom chord. For safety, a hand-rail 30 is provided which extends completely around the car, the hand-rail being mounted by brackets 32, and the car is provided with running boards 34 supported by brackets 36.

Figure 4:
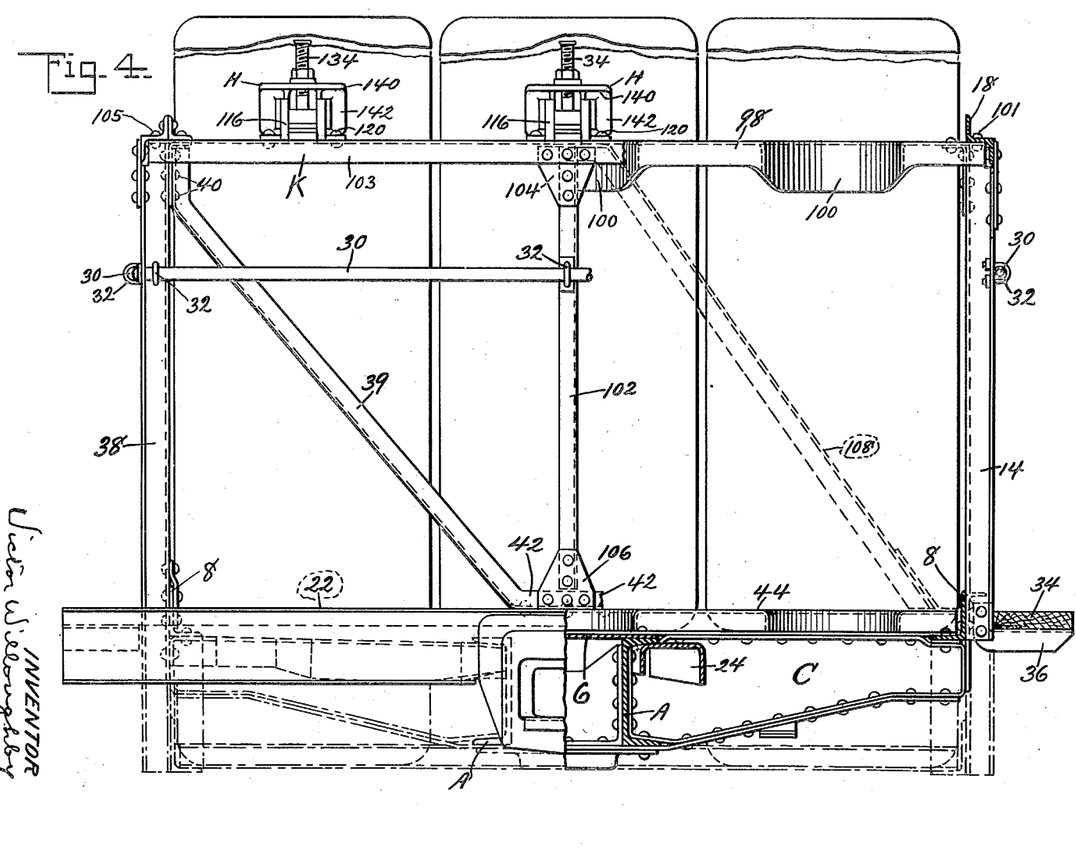
Fig. 4 is a view on the line 4—4 of Fig. 2.

The end verticals for purposes of illustration and description have been designated as 38, although they are similar to the other verticals heretofore mentioned as 14, and said verticals 38 are reinforced by transverse braces 39 at each end of the car, the ends of which are secured to the upper ends of the verticals as by rivets 40 and the intermediate portion 42 is secured to the end channel 44 as shown in Fig. 4.

The construction just described provides a car frame of strong and durable construction comprising the side girders, center sill, bolsters, cross-bearers and end constructions; the side girders and end constructions defining a space within which a plurality of tanks E are arranged in rows transversely across the car and also longitudinally of the car, one longitudinal row of tanks being arranged over the center sill and the other rows on each side thereof with certain of the tanks in the longitudinal rows on each side of the center sill seated below the level of the center sill whereby to retain the center of gravity of the car as low as possible to prevent any tendency of the car and its contents tilting or leaning in transit while rounding curves, etc.

The specific construction of the tank supporting and retaining means will be particularly pointed out hereinafter, but as can be clearly seen in the drawings, the same comprises a plurality of lower cradles indicated generally at F, a plurality of upper cradles G and clamping devices or retaining elements H, mounted on channel pressings K, arranged intermediate the cradles G.

Figures 9, 10, 11:
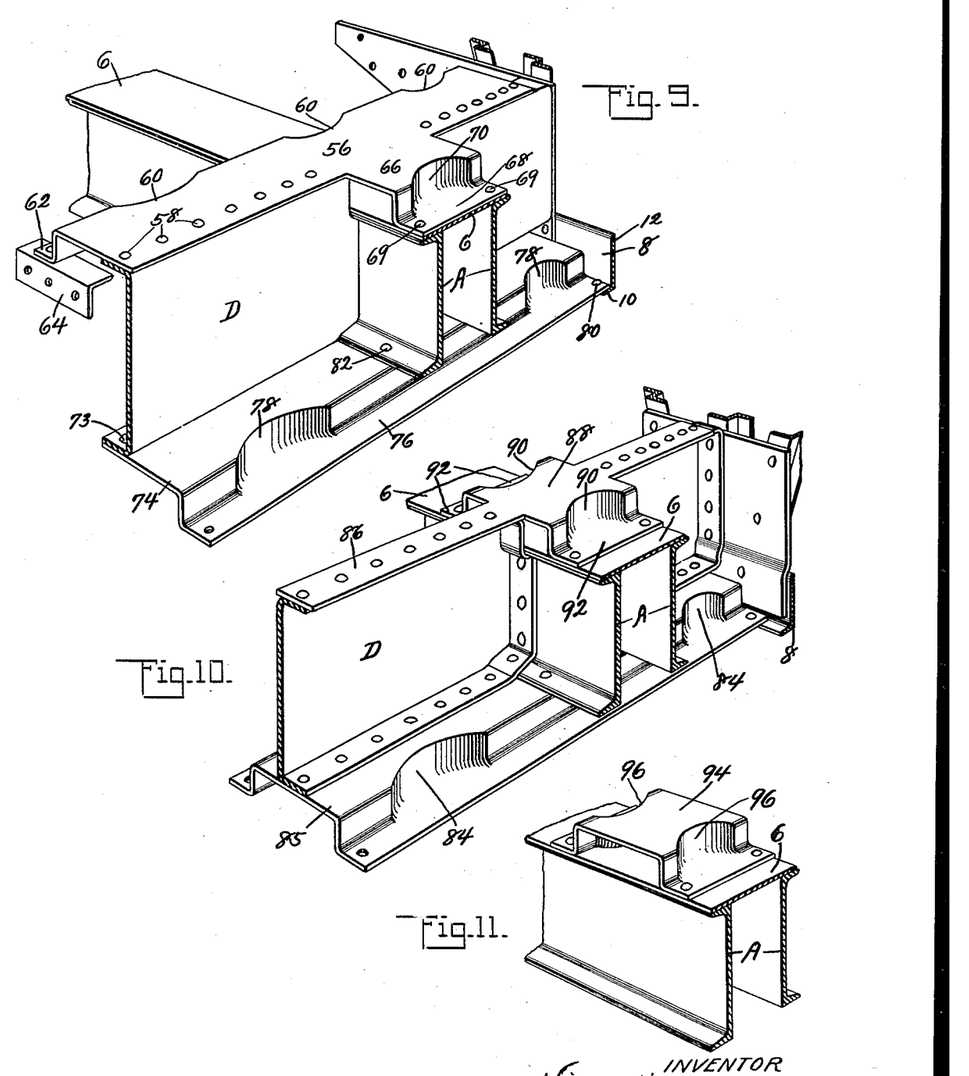
Figs. 9, 10 and 11 are detail perspective views of portions of the car showing the tank supporting cradles.

The lower cradles are secured to and supported by the lower chords 8 and by the cross-bearers and center sill and are formed with depressions shown clearly in Figs. 9, 10 and 11 into which the lower ends of the tanks extend whereby to support said tanks.

Figures 1, 8:
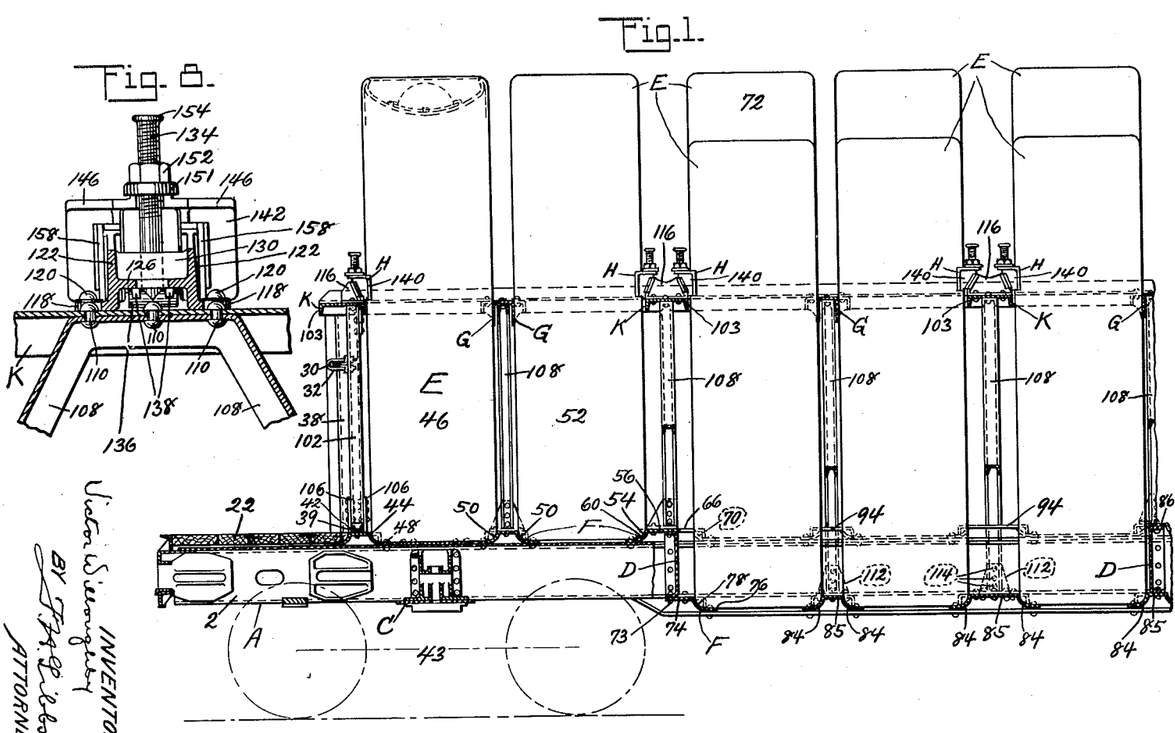
Figure 1 is a view partly in section of a portion of a car of the present invention, the view being taken on the line 1—1 of Fig. 2.
Fig. 8 is a sectional view on the line 8—8 of Fig. 7.

In carrying out the present invention whereby certain tanks are arranged at a lower level than others, the cradles adjacent each end of the car and over the trucks 43 are mounted above the center sill, and referring to Figs. 1 and 5, it can be seen that the cradles comprise in general inverted channels. For purposes of description, the end channel shown in Figs. 1 and 2 has been designated as 44, and the same is provided with spaced depressions to receive the ends of the first transverse row 46 of tanks E. The cradle 44 extends between and is secured to the opposite lower chords 8 by means of suitable fasteners such as the rivets 48, and if desired may be secured to the center sill by suitable fasteners. The next adjacent cradle has been designated as 50 and is arranged in spaced relation to the cradle 44, and like cradle 44 is of inverted channel form and extends between the bottom chords 8 of the side girders and is secured thereto by suitable rivets or the like. The cradle 50 is provided with depressions of such form as to receive the lower ends of the tanks in row 46. Therefore, the depressions are positioned opposite the depressions in the cradle 44, as will be apparent. The cradle 50 is provided on its other side with depressions in which the lower ends of the tanks in row 52 are received. The tanks in row 52 are also supported by a cradle 54 which is of the type shown in Fig. 9, and comprises a plate 56 riveted as at 58 to the upper flange of the cross-bearer D. The plate 56 is provided with a plurality of depressions 60 and an attaching flange 62 by which the plate is secured to oppositely arranged supporting angles 64 riveted or otherwise secured to the adjacent diagonals 16 and verticals 14, as clearly shown in Fig. 5. The construction just described, it will be apparent, supports the first two transverse rows of tanks designated as 46 and 52, the tanks being supported above the center sill. The plate 56 is provided with a forward extension 66 arranged over the center sill and formed with an attaching base 68, secured to the center sill by rivets 69 or the like, and said extension is provided with a depression 70 which receives the lower end of a central tank 72 to support the same above the center sill.

From this point on to the remainder of the depressed portion of the bottom chord, the tanks on each side of the center sill are arranged in a lower vertical plane than those positioned above the center sill, and to effect this arrangement, the cradles for supporting the lower ends of the tanks in this depressed portion of the car are positioned below the center sill and are secured thereto as hereinafter described.

Secured at its rear edge to the lower flange of the cross-bearer D by rivets 73 is a cradle 74 comprising a plate having the forward edge thereof formed into a supporting base 76 by angling said forward edge as shown in Fig. 9, and said plate is provided with depressions 78 adjacent each side edge and arranged on opposite sides of the center sill A. From an inspection of Fig. 9, it can be seen that the cradle 74 is also secured to the horizontal leg of the lower chord 8 by means of rivets 80 or the like, and further the cradle 74 is secured to the center sill by means of rivets 82. The remaining lower cradles 85 in this depressed portion of the car are inverted channels as shown in Fig. 10, the same being secured to the horizontal leg of the side sill 8 by rivets or the like and provided with oppositely arranged depressions 84 arranged on each side of the center sill A for supporting the lower ends of the tanks in an obvious manner. The intermediate cross-bearers D are provided with plates 86 secured to their upper flanges which are provided with cradles intermediate their ends, the same being designated in Fig. 10 as 88 and comprising the oppositely arranged depressions 90 and the attaching base 92 secured to the center sill cover plate 6 and top flanges of center sill A; these centrally arranged cradles, of course, being for the purpose of supporting the center row of tanks as will be apparent. Intermediate the cross-bearers, the cradles for supporting the lower ends of the center row of tanks are as shown more clearly in Fig. 11. and each comprises a short inverted channel 94 secured to the cover plate 6 and the center sill and provided with opposed depressions 96.

The upper cradles G are girders and are preferably of inverted channel form, being designated as 98 and having oppositely arranged depressions 100 formed therein to take the side walls of the tanks, said channels being arranged in spaced relation and extending between and being secured to the upper chords 18 of the side girders by means of the rivets 101 (see Fig. 4). At each end of the car and extending between and secured to the top chords 18 and further, arranged between the upper cradles G are the pressings K which are the mounts for the clamping devices H. As shown in Fig. 1, the pressings are of inverted channel form designated as 103 and are riveted as at 105 to the top chords 18. For bracing the end pressing K, a vertically arranged brace 102 is secured thereto by means of a gusset 104, the brace extending downwardly and being secured to the brace 39 by means of a gusset 106, as clearly shown in Fig. 4. The remaining upper cradles G and pressings K are reinforced by inverted V shape braces 108 secured to the cradles and pressings respectively by rivets 110 as clearly shown in Fig. 8, with their legs extending to the lower cradles and being connected thereto through connecting plates 112 by means of the rivets 114, as shown in Fig. 3. The construction just described provides a rigid mounting and reinforcing of the upper cradles and pressings, as will be apparent, the braces not only reinforcing and supporting the upper cradles and pressings, but also serving to aid in tying or rigidly connecting the side girders and upper cradles and pressings and the lower cradles together.

This invention also contemplates means for wedging or clamping the tanks in the cradles to prevent relative shifting and undue vibration thereof, and to that end the pressings K are provided with oppositely arranged clamping elements H heretofore mentioned, the specific construction of which is shown in detail in Figs. 6, 7 and 8. Referring now to these figures, it can be seen that the pressings K are provided with spaced clamps 116 each comprising an attaching base 118 by which they are secured to the channels by rivets 120. The base is of the form shown and is provided with side webs 122, the ends of which are rearwardly inclined as shown at 123 to provide wedge faces, the purposes of which will be hereinafter described. The webs 122 are of greater length at their lower edge than the attaching base and overlap the opposite flanges of the channel on which they are mounted, as shown at 124, whereby to center the clamp assembly on the girder. The base is provided with a central horizontal web 126 formed with the webs 122, and said web 126 is provided with reinforcing ribs 130 and also with oppositely arranged apertures 132, through which latter the clamp bolts 134 extend. The bolts 134 are each provided with a retaining head 136 to prevent removal thereof, and the web 126 is provided with depending retaining lugs 138 adjacent the apertures, for an obvious purpose.

Mounted on the bolts 134 are wedge blocks 140, the outer faces of which are shaped to conform to the surfaces of the tanks.

In the drawings, the tanks are shown as cylindrical, and therefore the wedge blocks are, of course, provided with arcuate engaging faces. The wedge blocks are preferably of the form shown in these Figs. 6 and 7, each comprising a main body portion 142 of arcuate form to provide the before-mentioned engaging faces 144, and the upper portion is provided with a rearwardly extending reinforcing web 146, as shown clearly in Fig. 6 and with an integral lug 148 apertured as at 150 whereby to slidingly position the wedge block on the bolt 134. The lug 148 may be of any desired form, but is preferably of such form as to take a bearing cap 151 against which the binding nut 152 is adapted to work and to force the wedge block into contact with the tanks. The upper ends of the bolts 134 are upset as at 154 to retain the nuts 152 against loss.

The body portion of the wedge block is provided with rearwardly extending ribs 156 which are inclined to ride upon the inclined ends of the webs 122. The ribs 156, as clearly shown in Fig. 6, are arranged on each side of the lug 148 and one side edge of each thereof is flanged over to form a continuous lip 158 for the purpose of guiding the wedge blocks in their movement on the wedge faces.

From the above description, it is believed that the operation and construction of the car of the present invention will be fully apparent to those skilled in the art, and from such description, it can be seen that there has been provided a car of the multi-unit tank type in which the tanks therein are maintained in a vertical position. The tanks having been seated in the cradles, the nuts 152 are turned downwardly on the bolts and the wedge blocks will engage the tank sides and wedge the tanks in their cradles and prevent shifting of said tanks. Further, it will be apparent that the car of the present invention has a low center of gravity due to the positioning of the tanks in the depressed portion of the car frame, the center row of tanks being mounted over the center sill and the row of tanks on each side of said center row of tanks being positioned in a plane lower than the said center row of tanks.

What is claimed is:

1. A multi-unit tank car comprising an underframe having a depressed portion intermediate its ends, and a plurality of vertical tanks supported by the underframe in rows longitudinally of the car with the rows in the depressed portion arranged in a horizontal plane lower than the plane of the other rows.

2. A multi-unit tank car comprising an underframe, having side girders including top and bottom chords, lower cradles extending between the bottom chords, upper cradles extending between the top chords, a plurality of vertical tanks seated in the lower cradles, and clamping means intermediate the upper cradles for securing the tanks.

3. In a car, spaced trucks, an underframe having spaced top and bottom chords defining side sills, the latter having a depressed portion intermediate the trucks, a center sill extending straight from end to end of the car, lower cradles arranged over the center sill above the trucks, other lower cradles secured to the bottom chords beneath the center sill at the depressed portions of said chords, individual cradles secured to the top of the center sill intermediate the trucks for supporting vertical tanks, tanks mounted vertically in the cradles above the trucks, and tanks mounted vertically in the cradles secured to the depressed portions of the bottom chords.

4. In a car, an underframe having spaced top and bottom chords, a center sill extending from end to end of the car, lower cradles secured to and extending between the bottom chords, vertical tanks arranged in rows transversely and longitudinally of the car seated in the lower cradles, spaced upper cradles secured to and extending between the top chords, clamp mounting members secured to and extending between the top chords intermediate spaced upper cradles, and clamp means secured to said mounting members for retaining the tanks in the cradles.

5. A multi-unit tank car comprising a frame having spaced upper and lower chords defining side sills, lower cradles arranged between and secured to the bottom chords, vertical tanks seated in said cradles, upper cradles arranged between and secured to the upper chords and engaging the sides of said tanks, clamp mounts intermediate the upper cradles and secured to the upper chords, and oppositely arranged clamping means carried by said mounts and adapted to engage the sides of adjacent tanks to retain the latter in the cradles.

6. A car mounted on trucks and adapted for the transportation of a plurality of tanks comprising a frame including side sills having spaced upper and lower chords, the latter being provided with a depressed portion intermediate the car trucks, a center sill, lower cradle members secured to the lower chords over the trucks and arranged over the center sill, other lower cradle members secured to the lower chords at the depressed portions thereof and arranged below the center sill, clamp mounts secured to and extending between the upper chords, opposed clamping means carried by the mounts, and upper cradle members secured to the upper chords and arranged intermediate the clamp mounts and over alternate lower cradles.

7. In a car, an underframe comprising side sills having top chords and bottom chords provided with a depressed portion intermediate their ends, and a center sill extending straight from end to end, a center longitudinal row of vertical tanks arranged over the center sill, a longitudinal row of tanks at each side of said first named row, lower cradles at each end of the car arranged over the center sill for supporting the tanks in each row, and other lower cradles arranged beneath the center sill for supporting the tanks in the depressed portion of the bottom chords on each side of the center row of tanks at a lower level than the tanks in said center row.

8. A multi-unit tank car comprising a frame having transversely arranged upper and lower cradles for supporting vertical tanks in rows arranged longitudinally of the frame, certain of said lower cradles being positioned at a lower level than the remaining cradles intermediate the frame ends whereby tanks supported thereby will have their lower ends in a lower plane than the remaining tanks, and means engaging the sides of said tanks to retain the latter in the cradles.

9. In a car, a center sill, and a plurality of tanks arranged in rows longitudinally and transversely of the car, one longitudinal row being positioned over the car center sill and the other longitudinal rows being arranged on each side thereof with certain of the tanks arranged below the level of the center sill.

10. In a car, an underframe with a depressed portion intermediate its ends and a center sill extending straight from end to end, a longitudinal row of vertical tanks arranged over the center sill, a longitudinal row of tanks on each side of the center sill in the depressed portion of the underframe whereby to retain the center of gravity of the car at a low level.

11. A multi-unit tank car comprising a frame, a plurality of vertical tanks supported therein in rows arranged transversely and longitudinally of the car, spaced upper cradles engaging the sides of the tanks, clamping means arranged between and alternating with said cradles for engaging the sides of adjacent tanks in each longitudinal row to retain said tanks against displacement, braces secured to the lower portion of the frame and extending upwardly and secured to the upper cradles and to the clamp mounts intermediate their ends, a running board secured to the frame, and a hand-rail secured to the frame above the running board.

12. A multi-unit tank car comprising a frame mounted on trucks and having side girders provided with top and bottom chords, the latter being depressed intermediate the trucks, a center sill extending straight from end to end of the car, inverted channels secured to the bottom chords over the trucks and arranged over the center sill and provided with spaced depressions forming tank supporting cradles, lower cradles secured to the bottom chords at the depressed portion of the latter and arranged below the center sill for supporting the tanks on each side of said center sill lower than the latter, cradles secured to the center sill for supporting a row of tanks thereon, spaced upper cradle members extending between the top chords and arranged over alternate lower cradles and provided with opposed depressions for engaging sides of adjacent tanks, and clamping means arranged between pairs of upper cradle members for wedging adjacent tanks in the aforesaid opposed depressions.

13. In a car, side girders, a center sill, a plurality of longitudinal rows of vertical tanks mounted in the car, channels secured to and extending between the upper edges of the side girders and provided with opposed depressions engaging the sides of the tanks, clamp mounts arranged intermediate adjacent cradles and at the car ends, clamps secured to each clamp mount for engaging adjacent tanks of each row whereby to wedge said tanks into the depressions in the channels, and upwardly extending braces secured at the lower edge of the side girders and to the channels and clamp mounts intermediate the ends of the latter.

14. A car of the kind described comprising a frame having side girders provided with connected top and bottom chords, lower cradles secured to and extending between the bottom chords, channels secured to and extending between the top chords and arranged over alternate lower cradles, said channels having oppositely arranged depressions formed therein, clamp mounts secured to and extending between the top chords and arranged over the other lower cradles, a plurality of clamps secured to the clamp mounts, and braces secured to the lower cradles and extending upwardly and secured to the channels and clamp mounts.

15. A multi-unit tank car comprising a frame having upper and lower cradle members, a plurality of rows of vertical tanks arranged longitudinally of the car frame, the outer rows of tanks having those intermediate the end tanks arranged in a lower plane than the end tanks of said rows, and clamp means for retaining the tanks in said cradles.

16. A car mounted on trucks and adapted for the transportation of a plurality of tanks comprising a frame having upper and lower cradle members arranged transversely thereof, the lower cradles at the frame ends being positioned in a higher horizontal plane than the lower cradles intermediate the car trucks, clamp mounts intermediate the upper cradles, clamping means carried by said mounts, and braces secured to the upper cradles and clamp mounts for reinforcing said cradles and clamp mounts.

17. A car having side girders provided with connected top and bottom chords, tanks mounted vertically in said car, a plurality of spaced cradles secured to and extending between the top chords, clamp mounts positioned between pairs of cradles and at the car ends, and clamping means secured to the clamp mounts and adapted to engage the tanks to retain the latter against displacement.

18. In a multi-unit tank car, a plurality of tanks arranged vertically in rows transversely and longitudinally of the car, spaced upper cradle members engaging the sides of adjacent tanks in each row, and clamping means mounted between pairs of upper cradle members and alternating therewith for securing the tanks in said cradle members.

19. In a multi-unit tank car having side girders between which the tanks extend and cradles engaging the tanks, means for retaining the tanks in the cradles comprising girders extending between the upper edges of the side girders, clamp bases secured to said girders, bolts mounted in the bases and oppositely arranged wedge blocks carried by said bolts and riding on the bases for engaging the sides of adjacent tanks.

20. A multi-unit tank car comprising a frame provided with a center sill, a plurality of vertical tanks in said frame arranged in rows transversely and longitudinally of the frame with one longitudinal row arranged over the center sill and the other longitudinal rows on each side thereof, certain of the tanks in the rows on each side of the row over the center sill being positioned at a lower level than said row over the center sill whereby the center of gravity of the car is lowered, and cradles for supporting the tanks.

In witness whereof I have hereunto set my hand.

VICTOR WILLOUGHBY.